United States Patent
Adams et al.

(10) Patent No.: US 7,668,404 B2
(45) Date of Patent: Feb. 23, 2010

(54) METHOD AND SYSTEM OF DESKEWING AN IMAGE USING MONOCHROME CONVERSION TO SEPARATE FOREGROUND FROM BACKGROUND

(75) Inventors: Stephen P. Adams, Lexington, KY (US); Saikat Chaudhuri, Calcutta (IN); Larry J. Dicken, Lexington, KY (US); Joshua E. Ellingsworth, Lexington, KY (US); Michael L. Whitlock, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 773 days.

(21) Appl. No.: 10/880,873

(22) Filed: Jun. 30, 2004

(65) Prior Publication Data

US 2006/0002629 A1 Jan. 5, 2006

(51) Int. Cl.
*G06K 9/36* (2006.01)
(52) U.S. Cl. .................. 382/289; 382/296; 382/101
(58) Field of Classification Search ............. 382/289, 382/296
See application file for complete search history.

(56) References Cited

U.S. PATENT DOCUMENTS

| | | | | |
|---|---|---|---|---|
| 4,748,678 A | * | 5/1988 | Takeda et al. | 382/306 |
| 4,868,883 A | * | 9/1989 | Chen | 382/109 |
| 5,285,504 A | * | 2/1994 | Pavlidis et al. | 382/176 |
| 5,430,808 A | * | 7/1995 | Baird et al. | 382/176 |
| 5,506,918 A | * | 4/1996 | Ishitani | 382/289 |
| 5,734,761 A | * | 3/1998 | Bagley | 382/309 |
| 5,793,901 A | * | 8/1998 | Matsutake et al. | 382/294 |
| 5,901,253 A | * | 5/1999 | Tretter | 382/289 |
| 6,082,619 A | * | 7/2000 | Ma et al. | 235/462.1 |
| 6,173,073 B1 | * | 1/2001 | Wang | 382/176 |
| 6,226,417 B1 | * | 5/2001 | Yamagata et al. | 382/289 |
| 6,658,166 B1 | * | 12/2003 | Zlotnick et al. | 382/282 |
| 6,970,607 B2 | * | 11/2005 | Jia et al. | 382/296 |
| 7,133,573 B2 | * | 11/2006 | Brugger et al. | 382/289 |
| 7,145,699 B2 | * | 12/2006 | Dolan | 358/452 |
| 2002/0131642 A1 | * | 9/2002 | Lee et al. | 382/220 |
| 2003/0044086 A1 | * | 3/2003 | Jia et al. | 382/296 |
| 2003/0152272 A1 | * | 8/2003 | Venable | 382/199 |
| 2003/0215113 A1 | * | 11/2003 | Yoder | 382/101 |

* cited by examiner

*Primary Examiner*—Samir A. Ahmed
*Assistant Examiner*—Tsung-Yin Tsai

(57) ABSTRACT

A method and system of deskewing an image. The method and system includes capturing a first image, forming a number of regions within the first image, generating a bounding rectangles for each region, calculating an area for each bounding rectangle, rotating each region by an angle within a predefined range, finding the angle that minimizes the area of each bounding rectangle, and rotating each region by the angle found.

33 Claims, 11 Drawing Sheets

US 7,668,404 B2

METHOD AND SYSTEM OF DESKEWING AN IMAGE USING MONOCHROME CONVERSION TO SEPARATE FOREGROUND FROM BACKGROUND

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to image capture devices such as scanners and copy machines. More specifically, embodiments of the invention relate to methods and systems to align or deskew an image that has been misaligned or skewed during an image capture process.

2. Description of the Related Art

Scanners are commonplace and used for a variety of reasons, including creating an electronic version of a photographic film based image. Scanning such images and other items requires that the original be aligned with physical features of the scanner, such as a home position. If improperly aligned, the scanned image can be skewed. Misalignment problems often occur when a large numbers of items are scanned, such as in a copy machine, or when a user is rushed or inattentive. In some instances, it is not possible to correct the skew by rescanning the image. For example, there may be time constraints that prevent rescanning or the original may not be available at the time the misalignment is noticed. Thus, there have been some efforts to correct skew and alignment problems through image processing techniques.

SUMMARY OF THE INVENTION

Although deskewing methods and techniques exist, they are not completely satisfactory. Accordingly, in one embodiment the invention provides a method of deskewing an image. The method includes forming a number of regions within the image, generating a bounding rectangle for each region, calculating an area for each bounding rectangle, rotating each region by an angle within a predefined range, finding the angle of rotation that minimizes the area of each bounding rectangle, and rotating each region by the angle found.

Some embodiments of the invention provide a system for deskewing an image. The system includes a capture device and a processor. The image capture device provides the image to the processor. The processor is configured to receive an image; form regions within the image; generate bounding rectangles around each formed region; calculate the area of each bounding rectangle; rotate the region through a range of rotation values; and find the angle that minimizes the area of each bounding rectangle.

In another embodiment, the invention provides a method of deskewing an image where a user identifies regions to be deskewed within the image through the use of a cursor control device. The image is displayed to the user, and the user is allowed to identify regions that they wish to deskew. The method of deskewing then comprises generating a bounding rectangle for each identified region and finding an angle of rotation that minimizes the area of a bounding rectangle needed to completely enclose each identified region.

Other features and advantages of the invention will become apparent to those skilled in the art upon review of the following detailed description, claims, and drawings.

Figure 1:
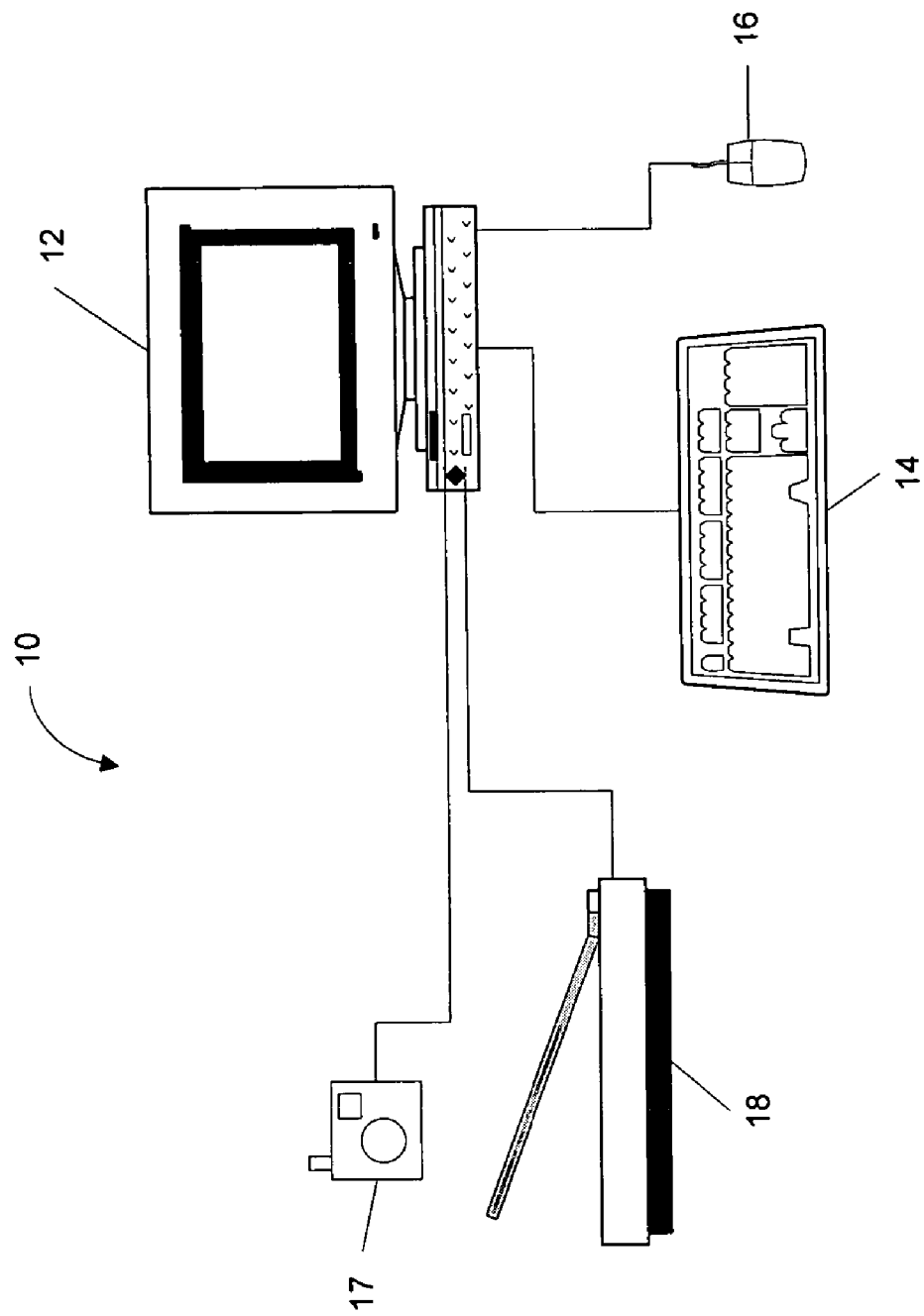
FIG. 1 is an illustration of an exemplary computer system including a workstation and a number of connected peripherals.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates an exemplary computer system 10. The system 10 includes a workstation 12 having a keyboard 14 and a cursor control device 16, which is shown in the form of a mouse. The workstation 12 is also connected to a digital camera 17 and another image capture device 18, which is shown in the form of a scanner. As should also be apparent, the system 10 could be configured to include multiple workstations, scanners, and other devices not shown. Routers, switches, or network connections allowing the scanner and possibly other components to communicate with multiple workstations could also be included. In addition, the various connections between elements of the system 10 could include both wired and wireless connections as well as local area network and wide area network connections.

Figure 2:
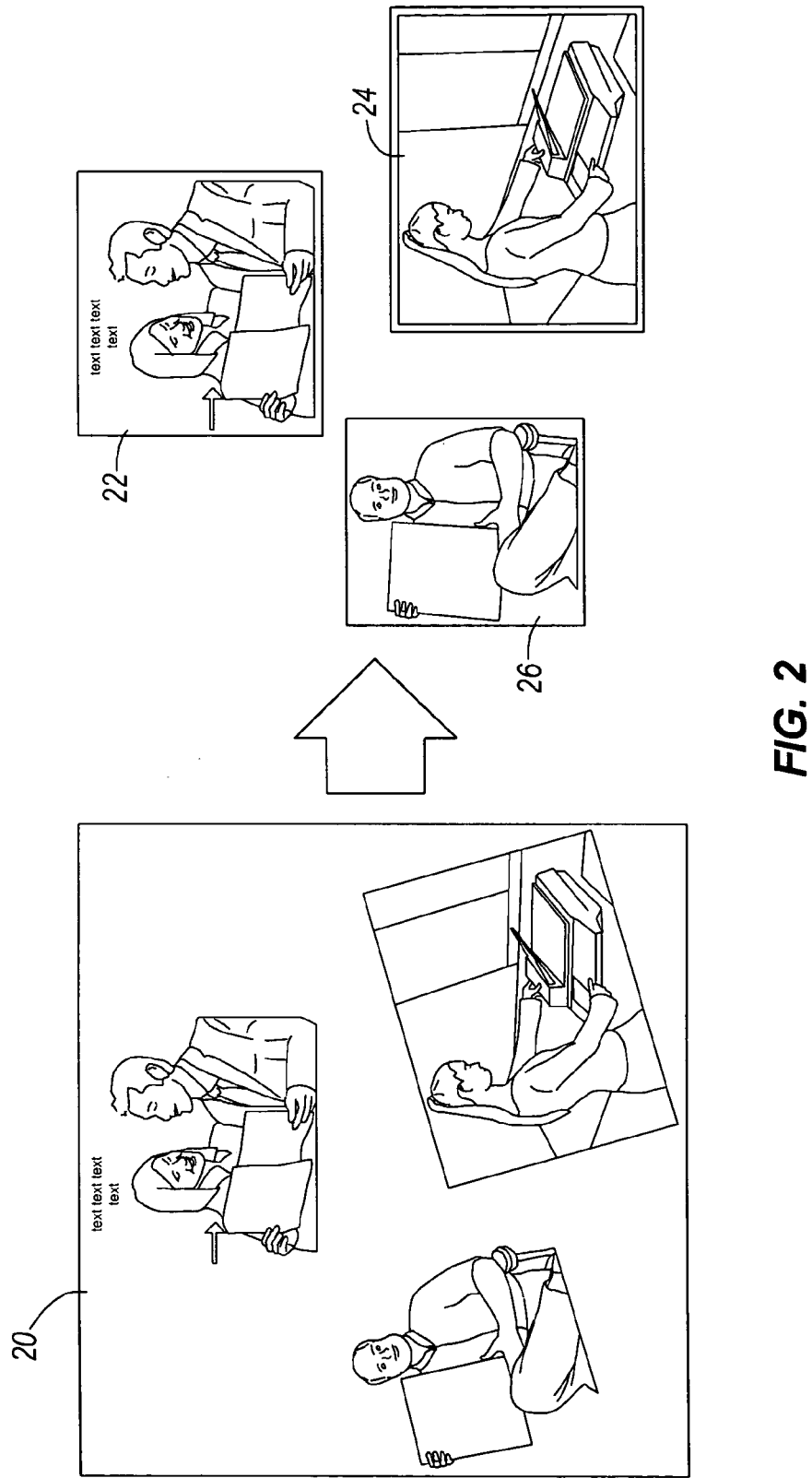
FIG. 2 illustrates skewed pictures and one desired output where the pictures are properly aligned.

FIG. 2 shows a scanned image 20 containing multiple picture regions, some of which are skewed with respect to the orientation of the entire scanned image. FIG. 2 also demonstrates the result of applying one embodiment of the disclosed algorithm to the scanned image 20. In one embodiment, the application of techniques and mechanisms disclosed results in the scanned image 20 being separated into multiple rectangular picture regions 22, 24, 26, which were contained in the image 20. The individual picture regions 22, 24, 26 are also deskewed so that each rectangular picture region 22, 24, 26 has either a portrait or landscape orientation.

Figure 3:
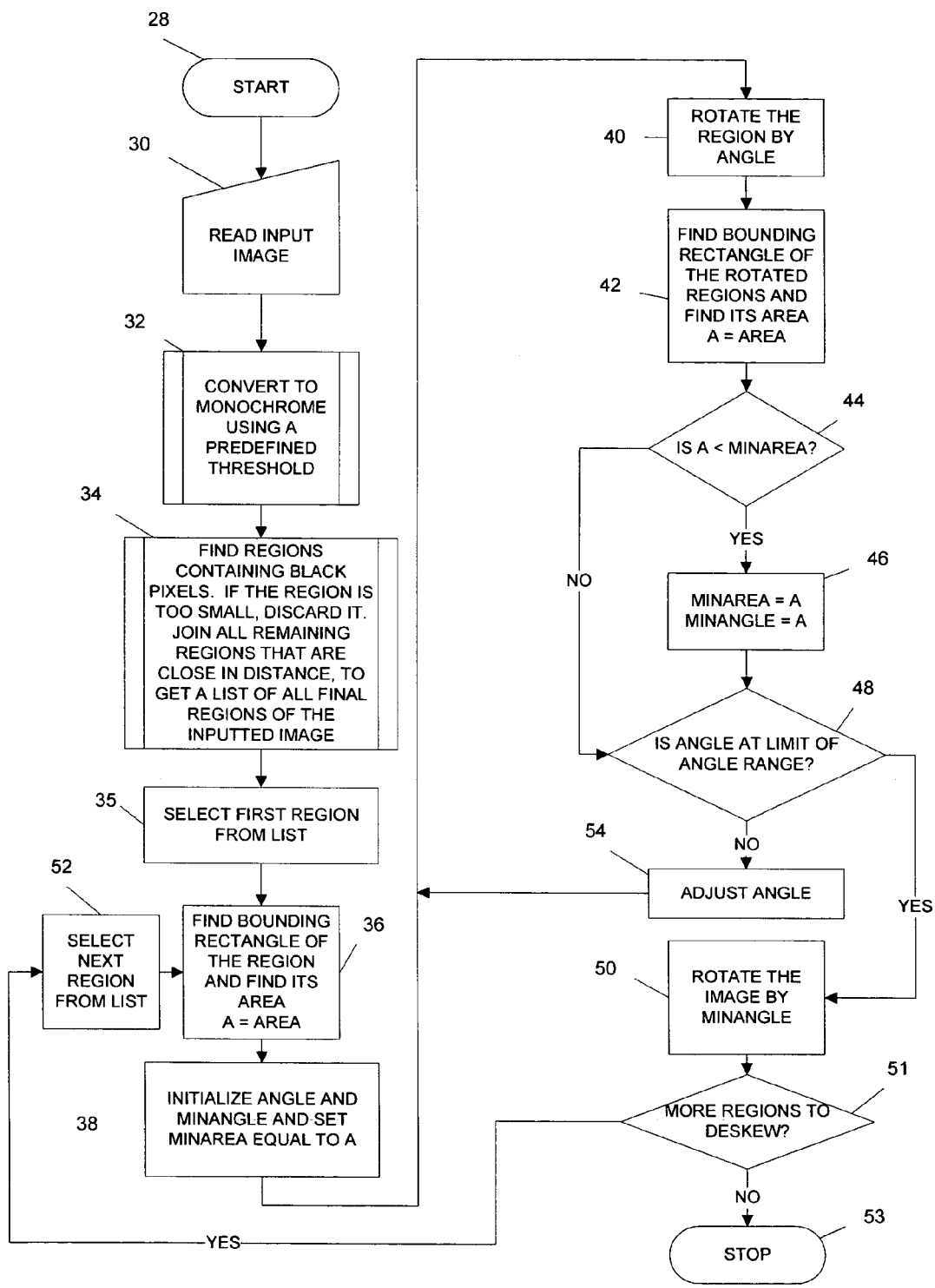
FIG. 3 is a flow chart of one implementation of a process of calculating a skew angle of a scanned image.

FIG. 3 demonstrates a process of deskewing a scanned image as depicted in FIG. 2. As may be seen by referring to FIG. 3, the process begins at start block 28. It should be understood that software implementing the process may be written and executed by a computer system such as the system 10. Alternatively, it is possible that hardware could be developed to implement the process. This might be accomplished, for example, by writing software to execute the process, and then using an HDL (hardware descriptor language) simulator to assist in the process of developing hardware to implement the functions of the software. Thus, in the discussion that follows, reference to the "processor" includes a processor executing software such as a processor in the workstation 12 that implements the process described, hardware designed to do the same, or combinations of hardware and software. Further, software embodying implementations of the invention may be stored in memory, such as memory in the system 10, and other computer readable media.

Figure 5:
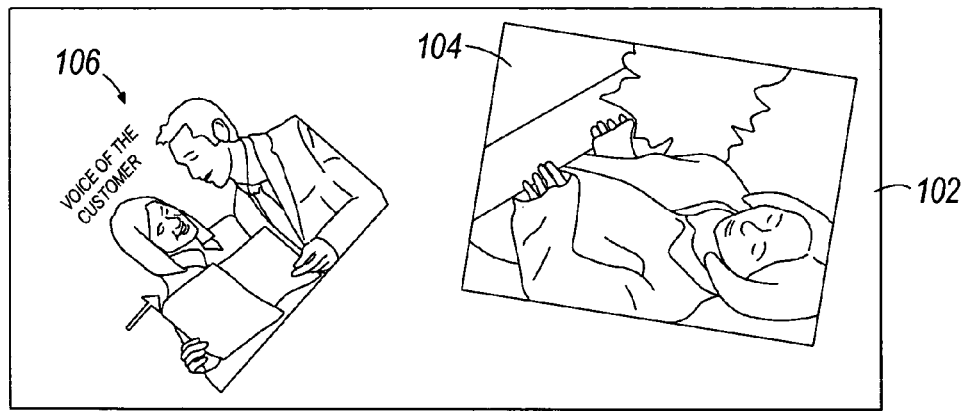
FIG. 5 illustrates an exemplary scanned image containing skewed pictures.
Figure 6:
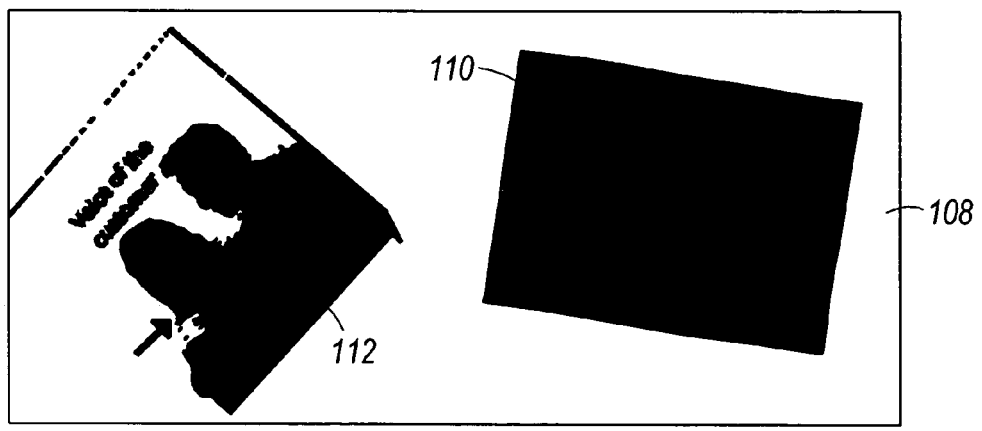
FIG. 6 illustrates the result of applying a monochrome filter to the scanned image of FIG. 5.

The process begins by obtaining a scanned image from the image capture device 18 (block 30). An exemplary scanned image 102 is shown in FIG. 5. The processor then converts the obtained image 102 to a monochrome image based on a threshold supplied by a user (block 32). The user enters a threshold value for the algorithm and the processor uses the supplied parameter to create a monochrome image or an image having only two colors, for example, black and white, from the obtained image 102. Creating a monochrome image may be accomplished by viewing the grayscale value of an individual pixel and setting it to black if the observed value is below a threshold value and setting the pixel to white if the reviewed value is above a threshold value. In color scanned images, an average of the red, green, and blue colors can be averaged and treated as a grayscale value for the purpose of gauging the color value of a pixel against a threshold value. A corresponding monochrome image 108 of the image shown in FIG. 5 is shown in FIG. 6.

Figure 7:
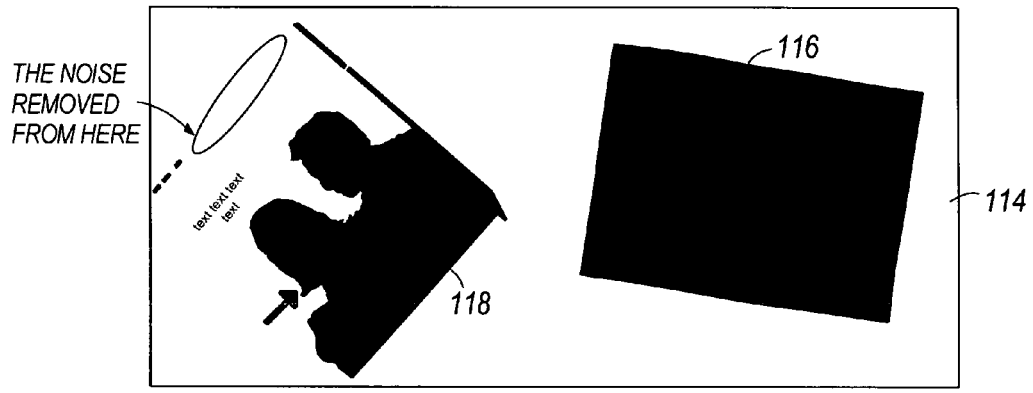
FIG. 7 displays the result of applying a noise filter to the altered scanned image of FIG. 6.

After the monochrome image 108 is created, a noise filter may be applied to the resulting monochrome image to eliminate any stray marks captured by the image capture device 18 which are unimportant to the scanned image as a whole. A mean or median filter could be applied which finds pixels that have extreme color values in comparison to their 3×3 neighbors and adjusts the color value of any found, extreme pixels to be the mean or median of the color value of its 3×3 neighboring pixels. Varying regions of neighboring pixels could be examined to uncover extreme color value pixels. For example, the 2×2 or 4×4 neighbors of each pixel could be examined to determine extreme color value pixels. Other types of filters could also be applied besides a mean or median filter. The color value of the extreme pixel could be adjusted by increasing or decreasing the color value by a set value or setting it equal to the color value of a single neighboring pixel. Since the filter is applied to a monochrome image in this example, the filter will eliminate any single or small discrete groups of black pixels surrounded by a vast majority of white pixels. FIG. 7 illustrates a filtered image 114 of the monochrome image 108 where stray marks were removed from the regions displayed in FIG. 6 by the application of a noise filter.

Figure 8:
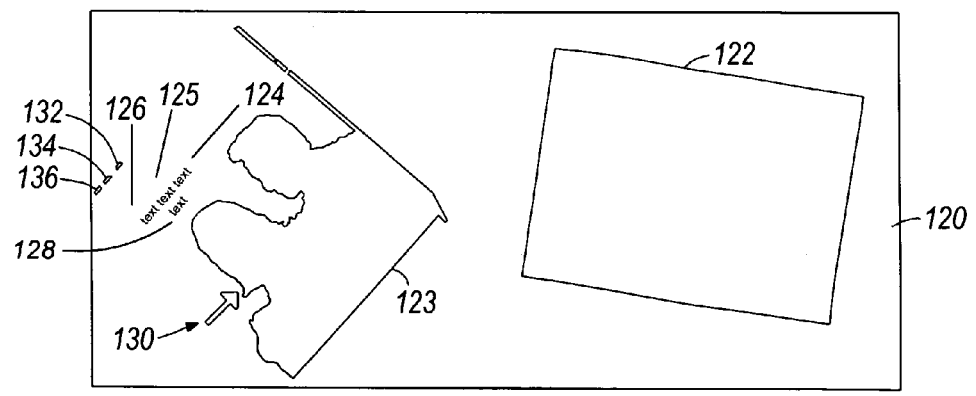
FIG. 8 displays the individual picture regions found in the altered scanned image of FIG. 7.

Taking the filtered image 114, the processor determines all regions of the scanned image that contain black pixels (block 34). The processor creates each region by initially searching for a black pixel, or non-white pixel depending on the two colors of the monochrome image. Once a pixel is found, a new region is created and its 3×3 neighborhood, or other neighborhood region chosen based on a desired quality or characteristics of the final output, is checked for any adjacent black pixels. Any found neighboring pixel that is also black is added to the region, thereby growing the region. This method is repeated for each non-white adjacent pixel found. The entire process is repeated for the entire scanned image and at the end of the process a collection of regions is created. FIG. 8 demonstrates regions 122, 123, 124, 125, 126, 128, 130, 132, 134, and 136 created from the filtered image 114 shown in FIG. 7.

Figure 9:
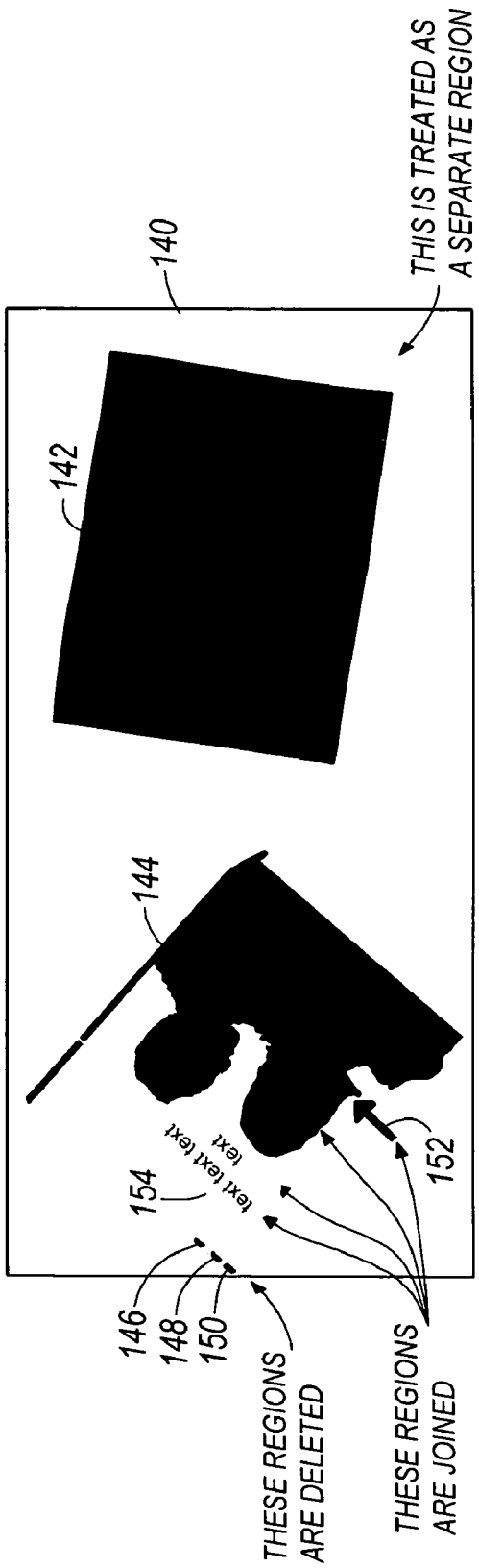
FIG. 9 displays the joining and deleting of the individual picture regions shown in FIG. 8.

Once the processor has formed all the regions 122, 123, 124, 125, 126, 128, 130, 132, 134, and 136 of the filtered image 114, the processor inspects the found regions for size and grouping characteristics. The processor may receive instructions from a user defining user-defined parameters specifying a size restriction for all found regions. If a found region does not meet the size constraint, it is considered unwanted and automatically deleted. Also, any two regions, or any subset of regions, that are located within a user-defined distance from each other are joined to become a single region. At the end of this process the processor possesses a list of surviving regions that will be considered picture regions of the original scanned image. FIG. 9 illustrates the regions that are deleted (146, 148, 150) and the regions which are joined (152, 154, 144) from the regions 122, 123, 124, 125, 126, 128, 130, 132, 134, and 136 shown in FIG. 8.

Figure 13:
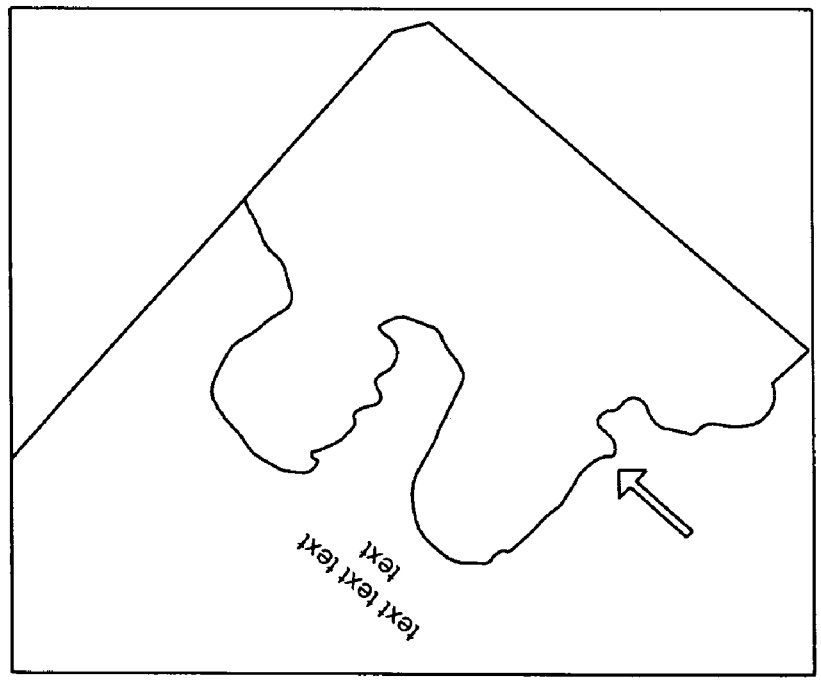
Figure 15:
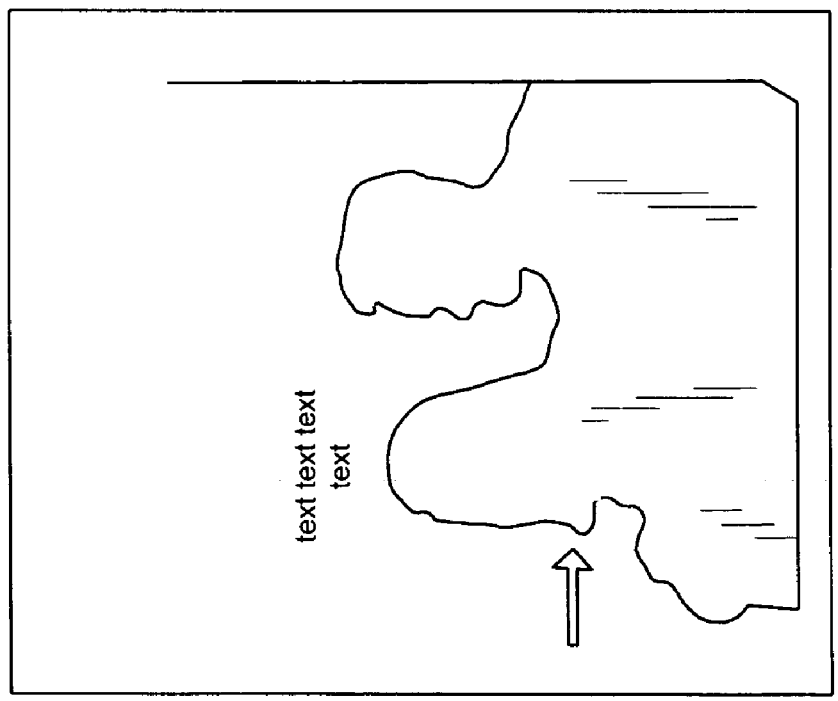

Next, the processor selects the first region recorded in it surviving regions list (step 35) and generates a bounding rectangle for the region (step 36). Examples of bounding rectangles are shown in FIGS. 13 and 15. In order to find a rectangle that completely encompasses a possibly non-rectangular region, the processor determines the area of the region to bound. A region may be thought of as a combination of a number of horizontal raster lines. These raster lines can be thought of as a series of rectangles with a height of 1 pixel. Thus, a summation of the areas of the raster lines making up the region provides the area of a polygonal segment defining a region. In the process of calculating the areas, information about the position and placement of the raster lines is also obtained. This information can be used to make a speculation about the content of the picture region. A document that is primarily text-based will contain a larger proportion of white space than a document consisting of graphical images. As a result, text-based raster lines will be less contiguous than graphical, lending insight as to the content of the region. Textual content does not have a continuous raster. It will be broken a number of times. The probability of this feature appearing in a graphical-based document is, therefore, less.

Figure 12:
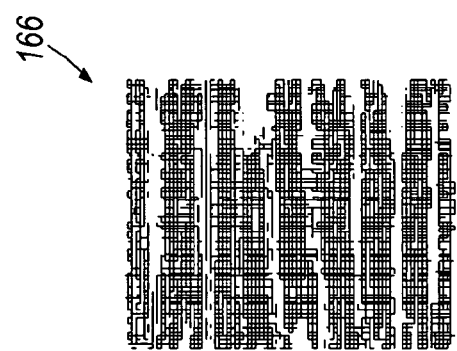
FIGS. 10, 11, and 12, taken together, illustrate differences between textual-based images and graphical-based images at pixel-level detail.
Figure 11:
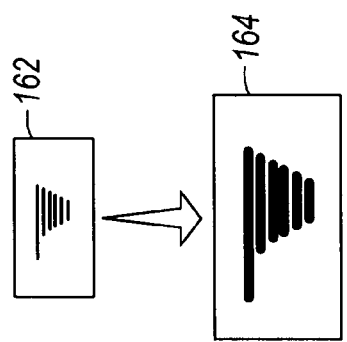
Figure 10:
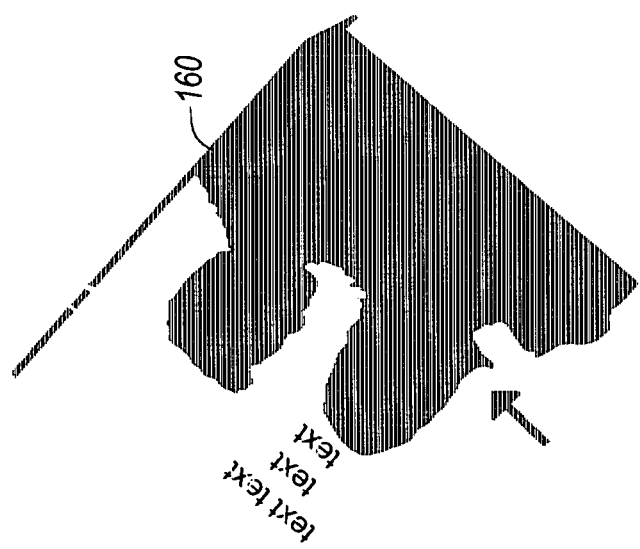

FIGS. 10, 11, and 12 provide an illustration of the difference in appearance of raster lines in a graphical-based document (FIG. 10) compared to a textual-based document (FIG. 12). The characteristics of the raster lines differ according to the type of content they are portraying. FIG. 10 illustrates a graphical region 160. FIG. 11 illustrates an exemplary raster line region such as those appearing within the graphical region 160. Region 162 in FIG. 11 is magnified and shown in more detail in region 164. Region 164 demonstrates the smoothness and continuity of graphical-based raster lines. In comparison, FIG. 12 illustrates a region 166 showing textual raster lines. The textual raster lines contained in region 166 are less continuous and contain more white space than the graphical-based raster lines illustrated in FIGS. 10 and 11. Upon determining whether a region is graphical or textual by observing the characteristics of the raster lines, the processor may perform more specific processing of the region. For example graphical-based regions could be processed by an image processing application and textual based regions could be processed by a character recognition application.

By finding the area of the raster lines making up a region, a bounding rectangle can be created which encompasses the area defined by raster lines of a region. Once a bounding region is created, its area is calculated.

Figure 14:
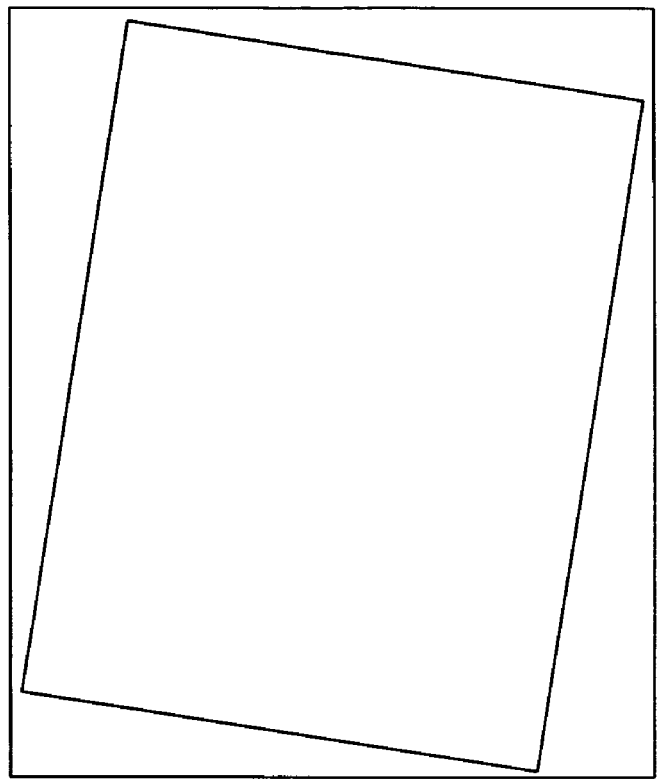
FIGS. 13 and 14 illustrate individual bounding rectangles for each picture region illustrated in FIG. 9.

In the next step of the process, the processor finds the rotation angle needed to deskew each of the regions (FIGS. 13 and 14). In some embodiments, the determination begins by initializing a set of variables used to find a deskewing angle. The names presented for the variables used are for the purpose of illustration only and are not intended to suggest that the use of variables or their names are mandatory. It should be apparent to one skilled in the art that other means to track and compare previous values to new values (e.g., setting flags) could be implemented instead of using variables. A variable named ANGLE may track the current rotation applied to a region. The processor may be configured to try a number of rotation angles within a range of possible angles. For example, the process may rotate the scanned image from −45° to +45°. The variable named ANGLE may be set to one end or limit of the range of possible angles and may be adjusted as angles within the range are tried. For example, the variable named ANGLE may be initially set to a minimum value specified by the range, such as −45°, although other initial values and range values are possible. In some embodiments, a variable named MINAREA tracks the area of the smallest bounding rectangle generated thus far. The variable MINAREA may initially be set to the value of the first bounding rectangle created. In some embodiments, a third variable named MINANGLE is set to the value of the angle at which the smallest bounding rectangle has been generated thus far. Initially, the variable MINANGLE may be set to the value of ANGLE as illustrated in FIG. 3 (step 38), although other initial values could be used.

Once the variables have been initialized, the processor begins by rotating the selected region by the amount indicated by the variable ANGLE (step 40). After the region has been rotated, the processor generates a new bounding rectangle which completely encloses the now-rotated region (step 42). The area of the new bounding rectangle is calculated and compared to the value stored in the variable MINAREA (step 44). If the new area of the new bounding rectangle is less than the area value stored in the variable MINAREA, the variable MINAREA is reset to the area calculated for the new bounding rectangle, and MINANGLE is reset to the value of the variable ANGLE which indicates the angle at which the region was rotated corresponding to the current bounding rectangle created (step 46).

The procedure or algorithm used can be understood in light of the following. The inventors have observed that the bounding rectangle of a region leaves the least amount of white space if the orientation of the regions is either portrait or landscape. When the region's orientation is portrait or landscape it can be enclosed by the smallest bounding rectangle. As a consequence, finding the smallest bounding rectangle after rotating the region through a range of degrees, for example from −45° to +45°, indicates the angle at which the region should be rotated in order to eliminate any skew present.

If the area of the new bounding rectangle is in fact greater than or equal to the value stored in the variable MINAREA, the processor does not update the value of the variables MINAREA or MINANGLE. In either case, the processor proceeds to determine whether the value of ANGLE is equal to or greater than the limiting degree value indicated in the range of degrees (step 48). In the current example, +45° is the final or limiting rotation angle tested, and, if the current angle of rotation or the value stored in the variable ANGLE is less than or within the limit indicated in the range, the value of ANGLE is adjusted to try another rotation angle. The value of ANGLE may be incremented by 1°, for example, so that on the next pass of the process the next sequential angle in the range is tested. Note that other adjustments may be made to the value of ANGLE such as changing the value to a randomly chosen angle, incrementing or decrementing the value by a preset amount like 5°, 10°, etc., applying an algorithm that specifies the next rotation angle to test based on the results of the previous tests, or the like. For example, an algorithm may be used that initially tests two rotation angles having a difference of a given amount and, based on testing the two angles, adjusts one of the angles to reduce the difference and narrow the range of angles to test. For example, initially the angles of −40° and 0° may be tested, and if the bounding rectangle calculated when the image is rotated −40° is smaller than the bounding rectangle calculated when the image is rotated 0°, the angle of 0° may be adjusted to decrease the difference between the two angles. For example, the difference may be cut in half, which generates another set of rotation angles to test, −40° and −20°. The process would continue, narrowing the range of possible angles at each cycle.

After the value of ANGLE has been adjusted, the process returns to step 40 where the region is rotated by the new value of the variable ANGLE.

Alternatively, if the value of the variable ANGLE is in fact greater than the final angle indicated in the range of angles provided, testing is complete and the value of the variable MINANGLE indicates the angle at which the region should be rotated to deskew the image, since the value of MINANGLE was the angle at which the smallest bounding rectangle was created to completely enclose the region (step 50). Step 50 includes rotating the image using the angle, and possibly the size of the smallest bounding rectangle created or determined, but it may also include returning or forwarding this information, along with the deskewed image, to an image processing device or application where the rotation will occur. For example, the deskewing process may append the determined angle of rotation and size of the smallest bounding rectangle to an image so that when it is displayed or printed it can be rotated as required.

Figure 16:
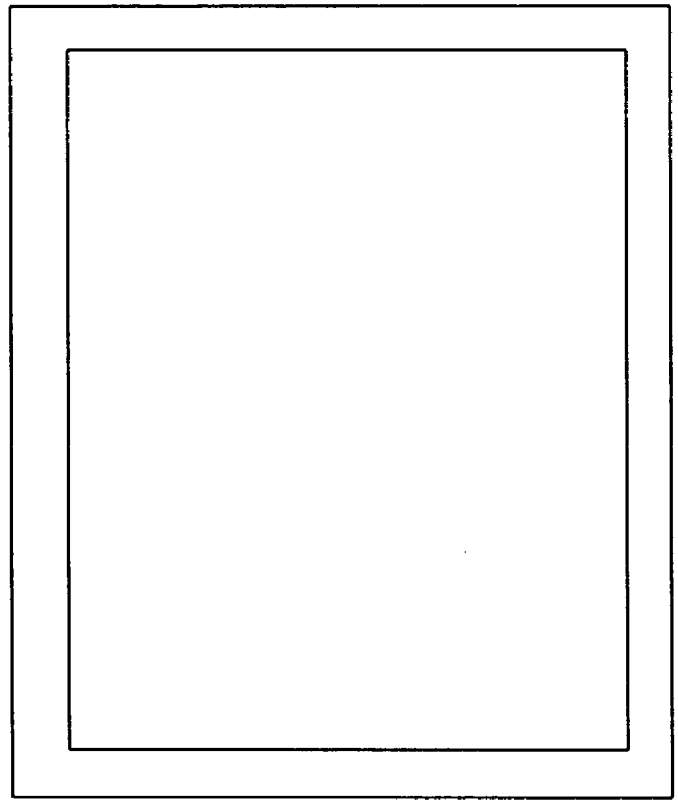
FIGS. 15 and 16 show each picture region shown in FIGS. 13 and 14 deskewed inside their respective bounding rectangles.

If there are more regions to deskew (step 51) the processor selects the next region (step 52) and repeats the above described process starting by finding an initial bounding rectangle for the next selected region (step 36). If there are no more regions to be deskewed, the processor has completed its task and can stop (step 53). FIGS. 15 and 16 illustrate the separated and deskewed regions of the initially scanned image 102 shown in FIG. 5.

Figure 4:
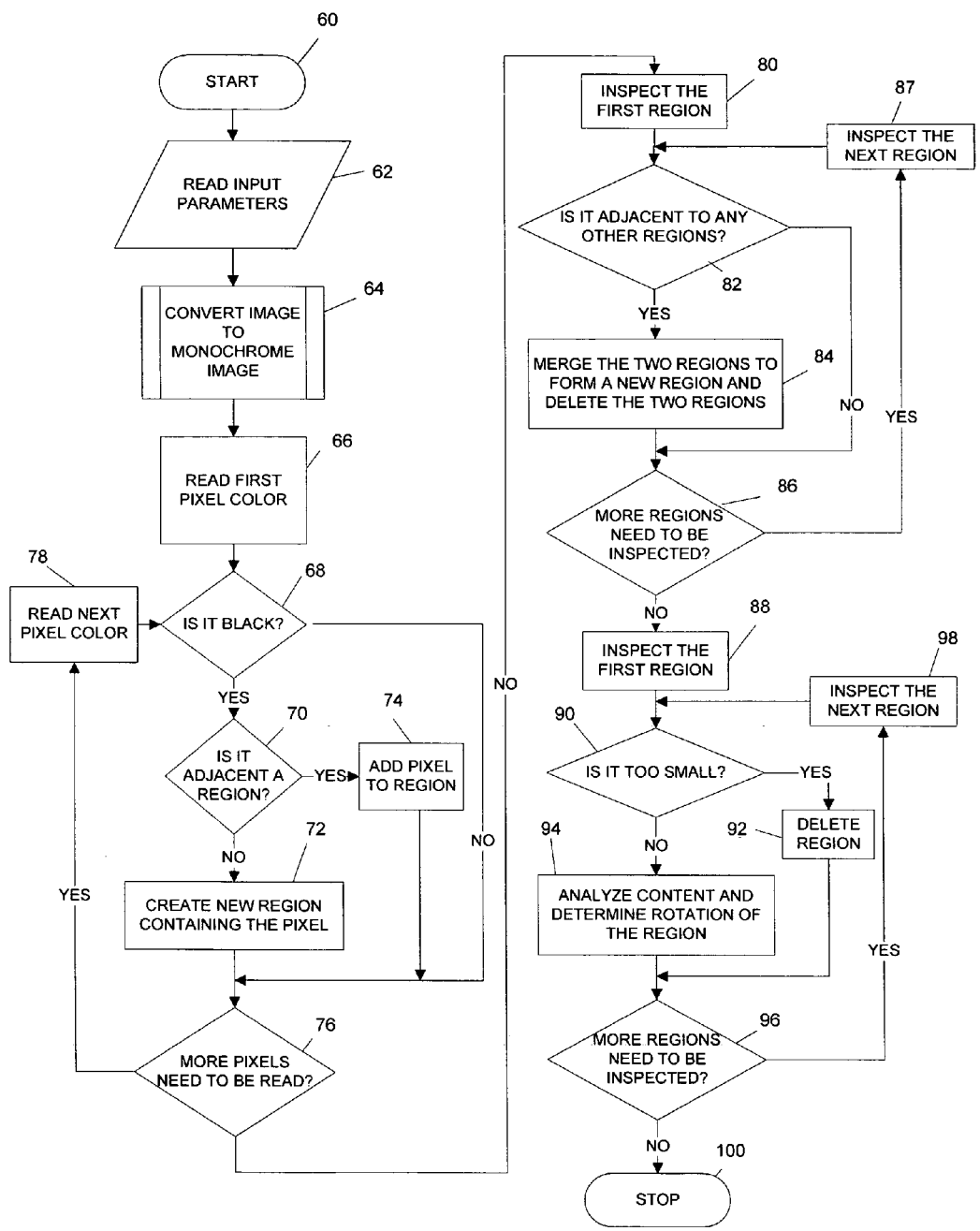
FIG. 4 is a flow chart detailing a portion of the flow chart of FIG. 3 where individual picture regions of a scanned image are constructed.

FIG. 4 provides additional details of the process of finding regions within a scanned image, which was previously described in block 34 of FIG. 3. The process beings at start block 60. Then, input parameters from a user are read (step 62). The parameters may include a threshold value, a minimum separation value, a minimum size value, and a scanned image. After receiving the parameters from the user, the processor converts the scanned image to a monochrome image based on the threshold value specified as described above.

Once the scanned image has been converted to a monochrome, or two-color, image, the processor begins the process of determining the regions of the scanned image so that the picture segments of the scanned image can be separated and deskewed separately. The processor begins by reading the color of the first pixel of the monochrome image (step 68). In the current example, black and white are the two chosen colors for the monochrome image although other color pairs are possible. If the pixel color is black (step 68) the processor determines whether the read pixel is adjacent an already-created region (step 70). If the pixel is not adjacent an already-created region, a new region is created containing the pixel (step 72). If the read pixel is adjacent an already-created region, the pixel is simply added to that region (step 74). The processor than queries whether more pixels need to be read from the scanned image (step 76), if more pixels need to be read, the processor proceeds to step 78 where the next pixel is read and the process begins again starting with step 68 where the color of the pixel is judged.

Alternately, if all the pixels of the scanned image have been read, the processor selects the first region created in the previous steps (step 80). The regions adjacent to the selected region are examined to determine whether the selected region is adjacent to another region or, more specifically, within the value of a minimum separation requirement parameter, input by the user (step 82). If the selected region and an adjacent region are separated by a distance that is less than the minimum separation requirement, the two regions are joined to form a new, single region, and the previous separate regions are deleted (step 84). If all adjacent regions to the selected region are farther from the selected region than the minimum separation requirement, the regions are not merged.

In either case, the processor then determines whether more regions need to be inspected (step 86). If more regions do need to be inspected and joined if applicable, the processor advances to step 87 where a next region is selected and the process is repeated starting with step 82.

Once all regions that are separated by a value less than the value specified by the minimum separation parameter are joined to form one single region, the processor selects a first region of the scanned image (step 88). The processor inspects the selected region and determines its size (step 90). If the size of the region is less than the minimum size requirement specified by the user, the region is deleted (step 92). If the selected region's size matches or surpasses the minimum size requirement, the region is maintained, the content of the region is analyzed, and the rotation of the selected region is determined (step 94) as described above and shown in FIG. 3.

In either case, the processor then determines whether there are more regions to inspect for size requirements and analyze and rotate if applicable (step 96). If the processor finds more regions to inspect, it selects the next region (step 98) and returns to step 90 to repeat the process.

If all regions have been inspected and those meeting the size requirement have been analyzed and rotated, the processor may stop (step 100) since all regions of the scanned image have been separated and rotated to deskew.

FIGS. 5 through 16 demonstrate the steps taken to deskew the regions of the scanned image 102. FIG. 5 illustrates the scanned image 102 containing separate picture regions 104, 106 that are both skewed independent of each other.

FIG. 6 shows the results of converting the scanned image 102 shown in FIG. 5 to the monochrome image 108. The picture regions 110, 112 are regions that contain only two colors of pixels, for example, black and white pixels.

FIG. 7 demonstrates the effect of applying a noise filter to the monochrome image 108. Stray marks, not true parts of the contents of the picture regions 116 and 118, are deleted as shown in region 118 in comparison to region 112.

FIG. 8 shows the regions 122, 123, 124, 125, 126, 128, 130, 132, 134, and 136 discovered by the processor. Each region represents a group of adjacent black, or non-white, pixels.

As seen in FIG. 9, the regions that are close to each other (152, 154, 144) are joined to become one region since they are separated by a value less than the minimum separation requirement. The small regions (146, 148, 150) are deleted since they do not meet the minimum size requirement to be considered a region of the scanned image.

FIGS. 10, 11, and 12 illustrate raster lines, or rectangles with a height of one pixel, which make up a printed image. As described above, textual-based raster lines contain a larger proportion of white space than graphical-based raster lines. Consequently, textual-based raster lines are much less continuous than graphical-based raster lines. This information can be used to deduce the content of the region. This information can be used to process scanned images differently based on whether they are textual-based scanned images, or graphical-based scanned images. Textual-based scanned images may, for example, be sent on for further processing where the information presented in the scanned image can be read and used as data.

FIGS. 13 and 14 show the initial bounding rectangles generated which completely encompass the regions of the scanned image. FIGS. 15 and 16 show the smallest bounding rectangles generated when the regions are rotated at an angle at which the regions had either a portrait or landscape orientation.

Figure 17:
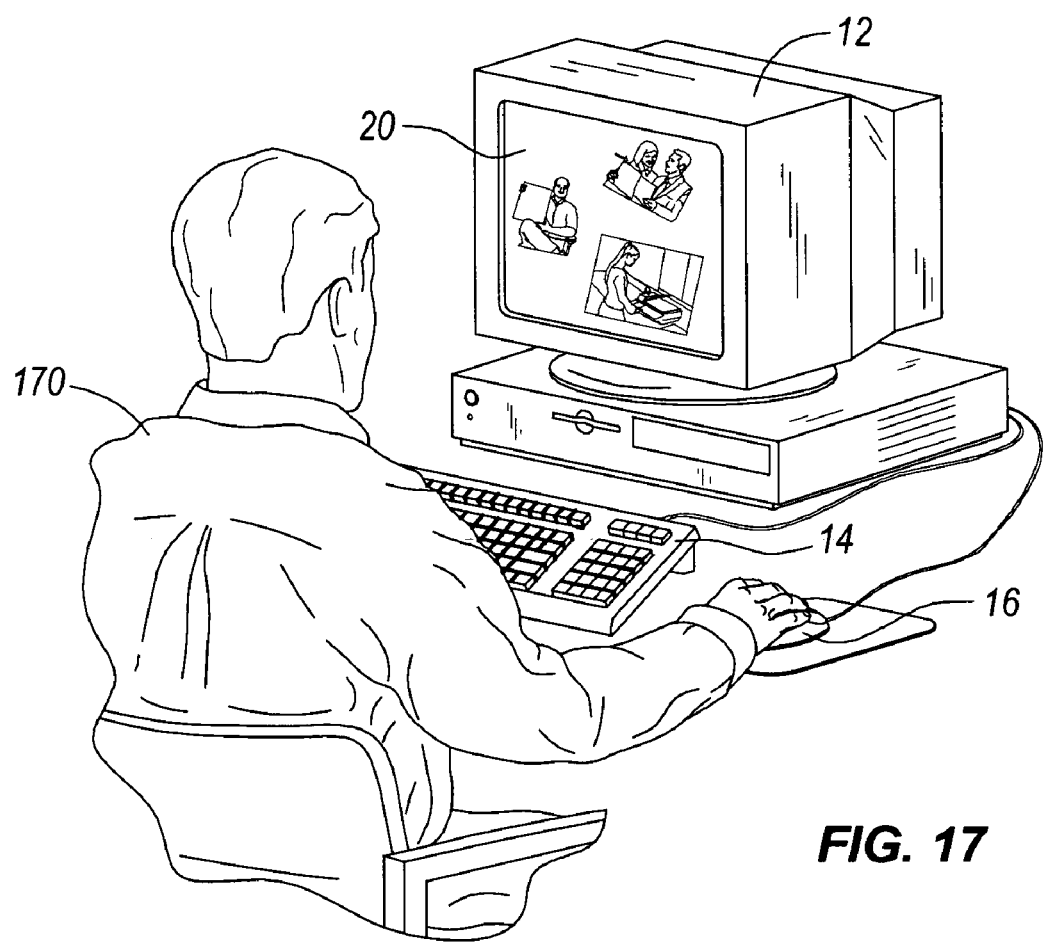
FIG. 17 shows the workstation and cursor control device of FIG. 1, with the display of the workstation presenting the exemplary scanned image of FIG. 2 containing skewed regions to a user.

The embodiments of the invention can also be applied to other deskewing problems. If, for example, a user uses a camera to take a picture and holds the camera at an angle above or below the horizon, the image captured may appear skewed within the picture, although the print would have a portrait or landscape orientation. The scanner 18 could then scan the internally skewed picture. Alternatively, an internally skewed digital image could be generated by the digital camera 17. In either event, the image could be displayed on a display of the workstation 12. Depending on the characteristics of the image, it may not be possible to determine that the internal picture is skewed. For example, if the picture was taken of an object where the majority of the background is white, the proposed algorithm might pick out the object as a region and deskew the object. If, however, the majority of the background is not white, the entire picture might be processed as a region and deskewed with respect to the external orientation of the picture, rather than the internal orientation. One mechanism that could be used to avoid these problems is to modify the proposed embodiments to allow a region to be drawn by the user. As shown in FIG. 17, the picture, for example, may be displayed on the display of the workstation 12, and a user 170 could use the cursor control device 16 to mark each region of the picture. By manually selecting the regions to deskew, the techniques and mechanisms disclosed could be used to deskew a region regardless of the characteristics of the picture.

Other features of the embodiments of the invention could be performed manually to ensure that the output is tailored to the specific input. After the regions of the image have been determined, these regions may then be presented to the user 170 on the display of the workstation 12 as shown in FIG. 17. The user 170 could then use the cursor control device 16 to manually select or mark regions to delete or ignore. The selections made by the user will be disregarded by the deskewing algorithm. The user 170 might also use the cursor control device 16 to join or separate regions by selecting regions, or subsets of regions, and dragging them together, or splitting them apart. The selections made by the user will be joined or separated manually rather than being performed by the deskewing algorithm. Allowing the user 170 to manually make decisions during the operation might also reduce or eliminate the need for the user 170 to input parameters beforehand.

Various features and advantages of the invention are set forth in the following claims.

The invention claimed is:

1. A method of deskewing an image, comprising the steps of:
   capturing a first image;
   forming a plurality of regions within the first image;
   generating a plurality of bounding rectangles for the plurality of regions;
   calculating a plurality of areas for the plurality of bounding rectangles;
   rotating the plurality of regions by a plurality of angles within a predefined range;
   following rotating the plurality of regions, finding a plurality of angles that substantially minimize the plurality of calculated areas of the plurality of bounding rectangles, each found angle for a region being deskew angle therefor; and
   rotating the plurality of regions by the plurality of angles found,
   wherein the above steps are performed by a processor.

2. A method as claimed in claim 1, further comprising receiving a plurality of parameters from a user.

3. A method as claimed in claim 1, further comprising converting the first image to a monochrome image.

4. A method as claimed in claim 3, wherein converting the first image to a monochrome image is based on a threshold value, where all color values below the threshold are considered a first color and all colors above the threshold are considered a second color different from the first.

5. A method as claimed in claim 1, wherein forming a plurality of regions within the first image further comprises: converting the first image to a monochrome image; and forming a plurality of regions of adjacent pixels with the same color values.

6. A method as claimed in claim 1, wherein forming a plurality of regions within the first image further comprises: displaying the first image to a user; sensing selections made to the first image by the user; and forming the plurality of regions based on selections by the user.

7. A method as claimed in claim 1, further comprising applying a filter to remove noise from the first image.

8. A method as claimed in claim 1, further comprising analyzing the plurality of regions.

9. A method as claimed in claim 8, wherein analyzing the plurality of regions comprises displaying the regions to a user.

10. A method as claimed in claim 1, further comprising adjusting the plurality of regions.

11. A method as claimed in claim 10, wherein adjusting the plurality of regions comprises deleting unwanted regions automatically based on a parameter input by a user.

12. A method as claimed in claim 10, wherein adjusting the plurality of regions comprises deleting unwanted regions manually based on selections indicated by a user.

13. A method as claimed in claim 10, wherein adjusting the plurality of regions comprises joining subsets of the plurality of regions automatically based on a parameter input by a user.

14. A method as claimed in claim 10, wherein adjusting the plurality of regions comprises joining subsets of the plurality of regions manually based on selections indicated by a user.

15. A method as claimed in claim 1, wherein the predefined range for rotating the region extends from about −45 degrees to about 45 degrees.

16. A method as claimed in claim 1, wherein rotating the region by an angle within a predefined range is accomplished by stepping through the predefined range by a preset amount.

17. A method as claimed in claim 16, wherein the preset amount is 1 degree per rotation.

18. A method as claimed in claim 1, wherein rotating the region by an angle within a predefined range is accomplished by testing two rotation angles.

19. A method as claimed in claim 1, wherein forming a plurality of regions comprises:
   reading a first color value of a first pixel;
   determining if the first color value matches a region color value;
   if the first color value matches the region color value, creating a first region containing the first pixel; if the first color value matches the region color value, reading a second color value of a second adjacent pixel to the first region;
   determining if the second color value matches the region color value;
   if the second color value matches the region color value, adding the second pixel to the first region;
   reading a third color value of a third, non-adjacent pixel;
   determining if the third color value matches the region color value; and
   if the third color value matches the region color, creating a second region containing the third, non-adjacent pixel.

20. A system of deskewing an image, the system comprising:
   an image capturing device configured to capture a first image; and
   a processor configured to form a plurality of regions within the first image,
   generate a plurality of bounding rectangles for the plurality of regions, calculate a plurality of areas for the plurality of bounding rectangles, rotate each of the plurality of regions separately, following rotating the plurality of regions, finding a plurality of angles that substantially minimize the plurality of calculated areas of the plurality of bounding rectangles, each found angle for a region being deskew angle therefor, and record a plurality of minimum areas and corresponding angles for the plurality of bounding rectangles, the corresponding angles being independent from each other, and rotate each of the plurality of regions by the corresponding angle therefor.

21. A system as claimed in claim 20, wherein the processor is further configured to find a plurality of portrait or landscape orientated rectangles that completely enclose the plurality of regions.

22. A system as claimed in claim 20, wherein the processor is further configured to output the plurality of regions rotated at the recorded plurality of angles.

23. A system as claimed in claim 20, wherein the processor is further configured to analyze the content of the plurality of regions.

24. A system as claimed in claim 20, wherein the processor is further configured to interact with a user to receive instructions.

25. A system as claimed in claim 24, wherein the processor is further configured to adjust the plurality of regions formed by applying the set of instructions supplied by the user.

26. A system as claimed in claim 20, wherein the processor is further configured to form the plurality of regions within the first image by converting the first image to a monochrome image and finding groups of adjacent pixels that share one color of the two-color monochrome image.

27. A processor configured to:
  receive a first image from an image capturing device;
  form a plurality of regions within the first image;
  generate a plurality of bounding rectangles for the plurality of regions;
  calculate a plurality of areas for the plurality of bounding rectangles;
  rotate each of the plurality of regions;
  following rotating the plurality of regions, finding a plurality of angles that substantially minimize the plurality of calculated areas of the plurality of bounding rectangles, each found angle for a region being deskew angle therefor;
  record a plurality of minimum areas for the plurality of bounding rectangles; and
  rotate each region by an angle corresponding to a minimum area of the bounding rectangle for the region.

28. A system as claimed in claim 27, wherein the processor is further configured to find a plurality of portrait or landscape orientated rectangles that completely enclose the plurality of regions.

29. A system as claimed in claim 27, wherein the processor is further configured to output the plurality of regions rotated at the recorded plurality of angles.

30. A system as claimed in claim 27, wherein the processor is further configured to analyze the content of the plurality of regions.

31. A system as claimed in claim 27, wherein the processor is further configured to interact with a user to receive input.

32. A system as claimed in claim 31, wherein the processor is further configured to adjust the plurality of regions formed by applying the input supplied by the user.

33. A system as claimed in claim 27, wherein the processor is further configured to form the plurality of regions within the first image by converting the first image to a two-color image and finding groups of adjacent pixels that share one color of the two-color image.

* * * * *